July 8, 1969 P. R. GLEY 3,454,250
SNAP-IN LATCH OR FASTENER ASSEMBLY
Filed Oct. 12, 1967 Sheet 1 of 3
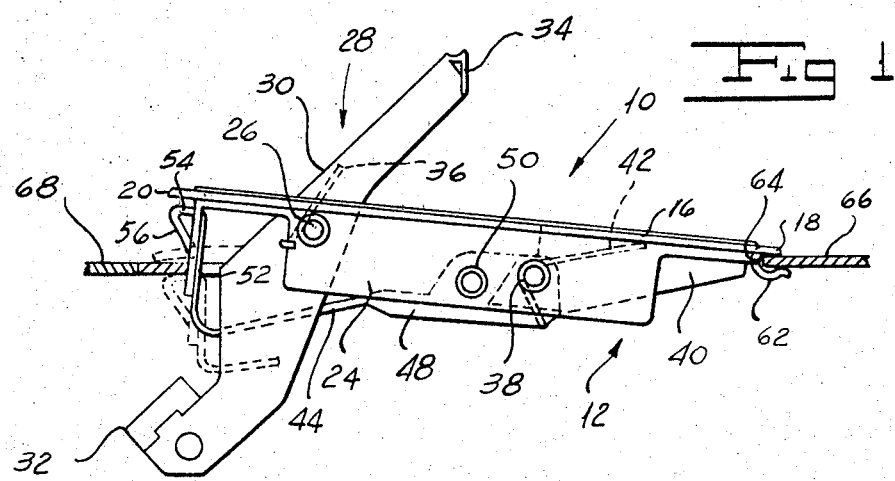
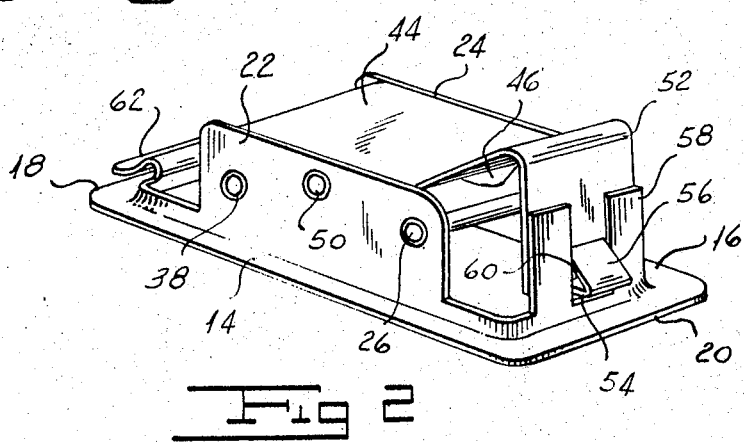
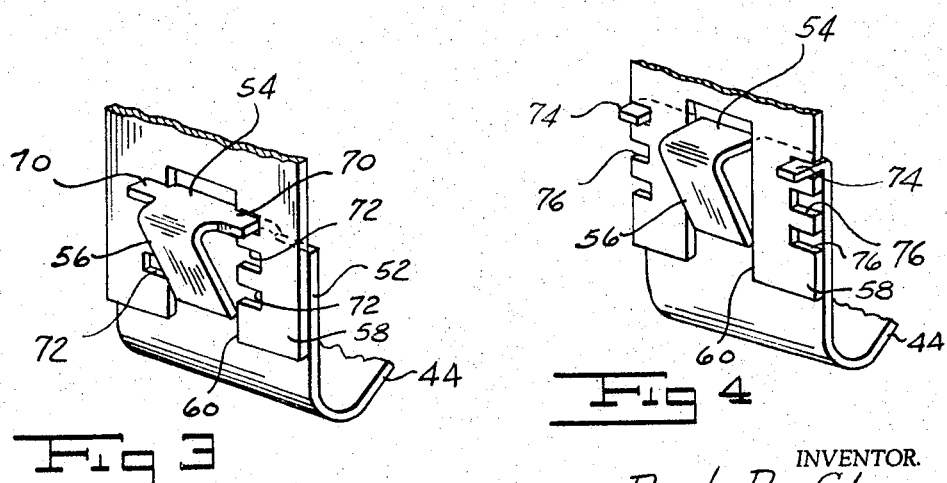
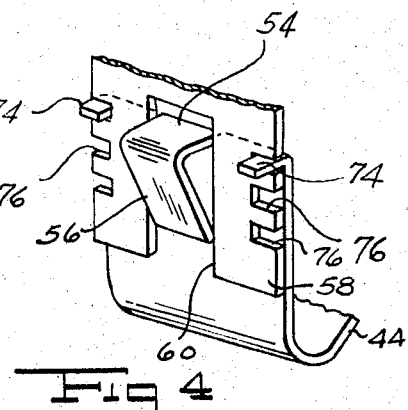
INVENTOR.
Paul R. Gley
BY
Shenier & O'Connor
ATTORNEYS

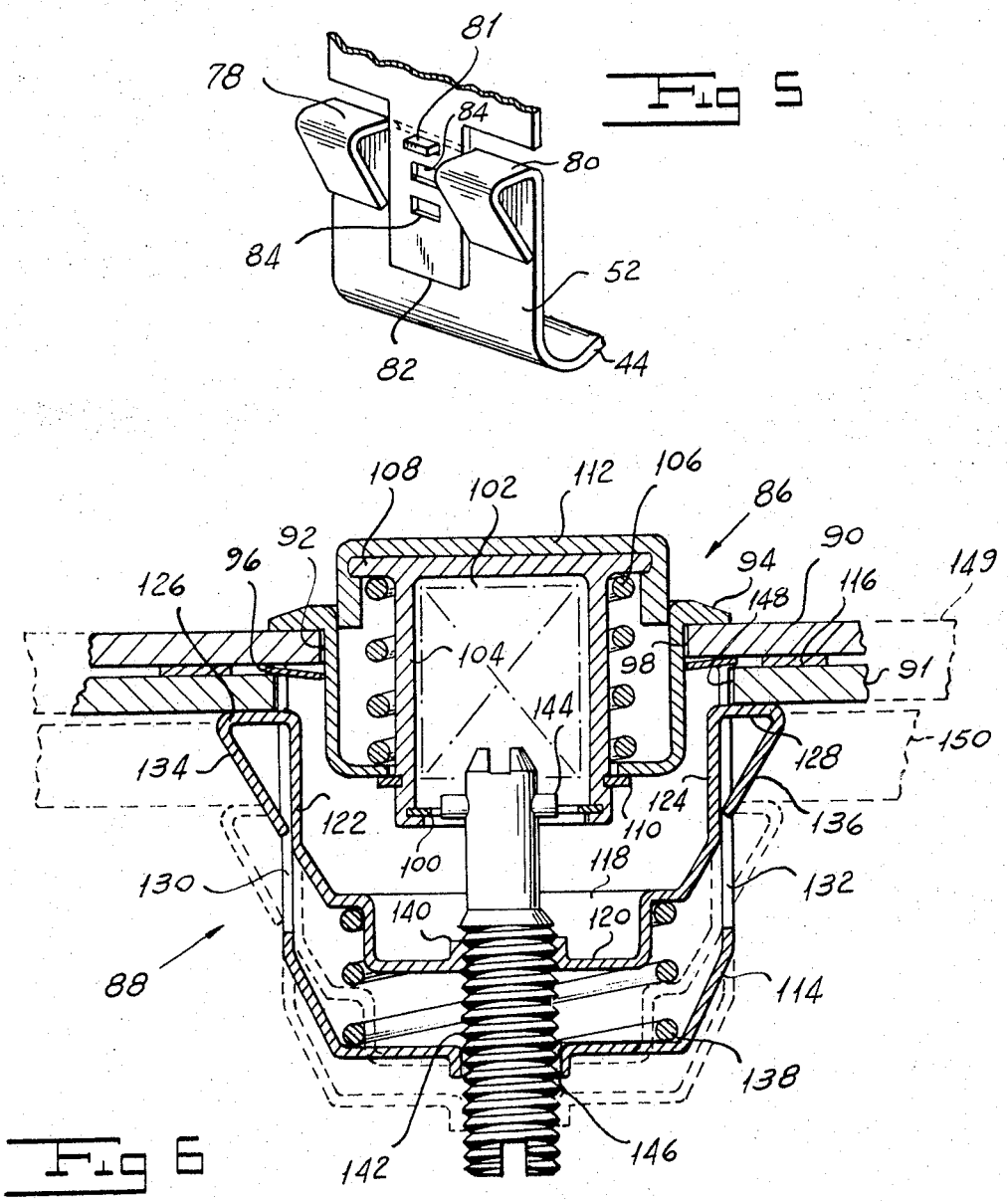

July 8, 1969 P. R. GLEY 3,454,250
SNAP-IN LATCH OR FASTENER ASSEMBLY
Filed Oct. 12, 1967 Sheet 3 of 3
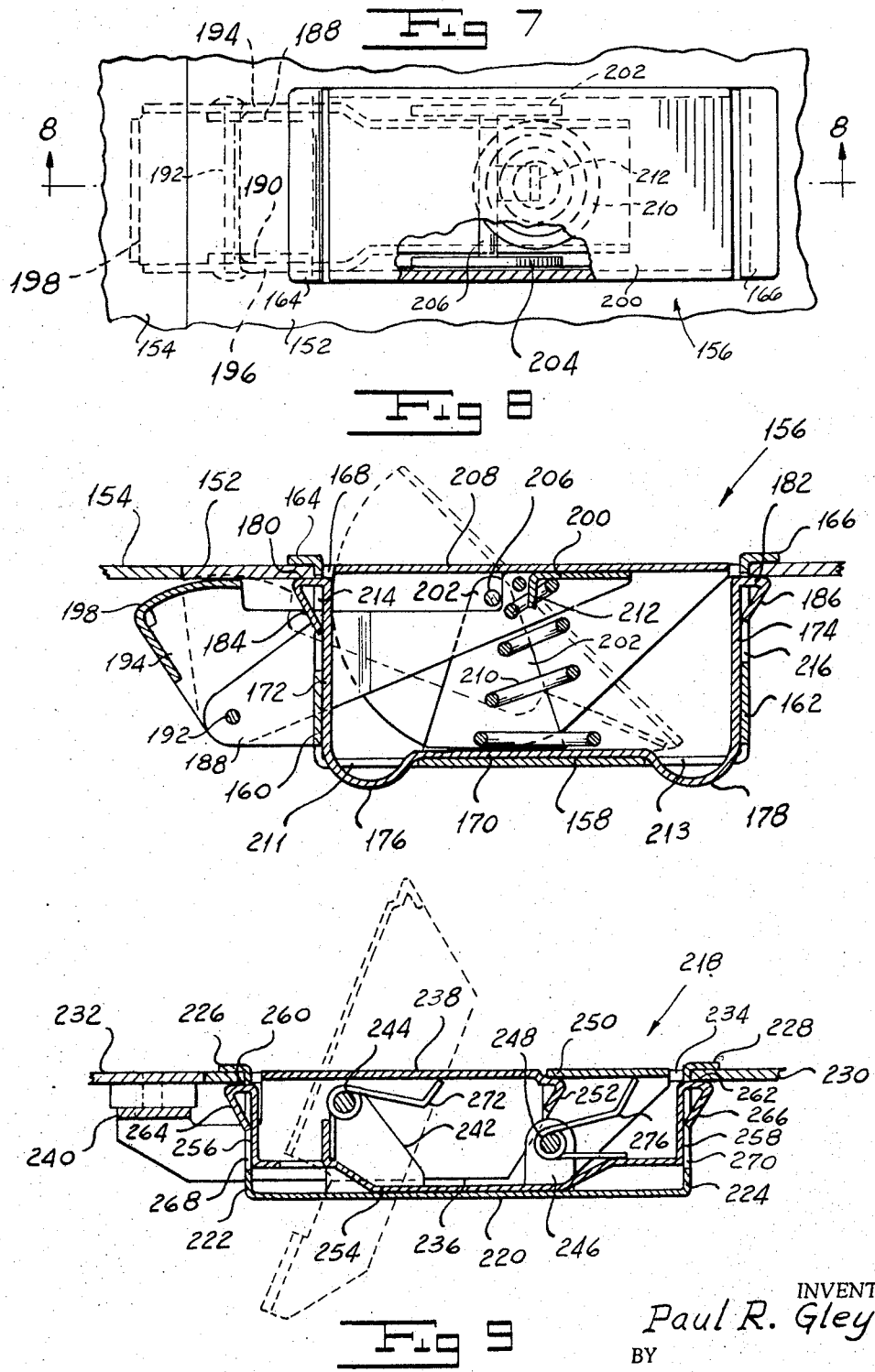
INVENTOR.
Paul R. Gley
BY
Shenier & O'Connor
ATTORNEYS United States Patent Office 3,454,250
Patented July 8, 1969

3,454,250
SNAP-IN LATCH OR FASTENER ASSEMBLY
Paul R. Gley, Hillsdale, N.J., assignor, by mesne assignments, to Rex Chainbelt Inc., Milwaukee, Wis., a corporation of New York
Filed Oct. 12, 1967, Ser. No. 674,858
Int. Cl. E06b 7/28; B65j 1/22
U.S. Cl. 248—223          10 Claims

ABSTRACT OF THE DISCLOSURE

A snap-in latch or fastener assembly in which a mounting member carrying a latch or fastener element resiliently supports a clamping element which snaps into position behind a mounting panel as the assembly is moved into a mounting opening to clamp the panel between the clamping element and the mounting member.

Background of the invention

A variety of types of latches and fasteners are known in the prior art. There are, for example, snap latches, toggle latches and the like, in which the latch is mounted on one of the members to be joined for movement into and out of latching engagement with a strike on the other member. There are also known fasteners, such as pushbutton fasteners, wherein a cross pin is mounted on one of the members for movement relative to locking cams on the other member to fastener a panel or the other member to fasten a panel or the like over a frame.

The latches and fasteners described above are provided with mounting brackets, or flanges, or frames, which are riveted or bolted in an opening in the member to which the element is to be applied. The operation of securing such an assembly to the member on which it is to be mounted necessitates the use of tools and the expenditure of a substantial amount of effort. Assemblies so mounted are not readily replaceable. They cannot, moreover, be moved from one installation to another without considerable difficulty. Where the same assembly is intended to be used on panels having thicknesses within a range of thicknesses, rivets or bolts of a number of correspondingly different sizes must be provided.

I have invented an assembly such as a latch or fastener assembly which overcomes the difficulties presented by assemblies of the prior art. My assembly can be mounted on a panel, or the like, without the use of tools. It does not require fastening rivets, bolts or nuts. It may be installed in a panel opening in a rapid and expeditious manner. My assembly is readily replaceable and may readily be removed to permit it to be used on another installation. My assembly is versatile in that it will accommodate panel thicknesses over a relatively wide range. My assembly is not limited to use with an opening of a particular configuration.

Summary of the invention

A snap-in latch or fastener assembly adapted to be mounted in an opening in a panel or the like in which a resilient arm supports a retainer on the member carrying the fastener or latch element for movement between a normal position extending beyond the edge of the opening and a second position clear of the edge of the opening. The member carries a flange adapted to engage the outer surface of the panel adjacent the periphery of the opening. As the assembly is moved into the opening cam means on the retainer moves it from its normal position to its second position so that when the flange engages the outer surface the retainer will snap into position behind the inner surface of the panel adjacent the openings.

One object of my invention is to provide a snap-in latch or fastener assembly which may be installed in a mounting opening without the use of tools or of auxiliary fasteners such as rivets or bolts.

Another object of my invention is to provide a snap-in latch or fastener assembly which may be installed in a mounting opening in a rapid and expeditious manner.

A further object of my invention is to provide a snap-in latch or fastener assembly which is readily replaceable.

Still another object of my invention is to provide a snap-in latch or fastener assembly which will accommodate panel thicknesses over a relatively wide range.

A still further object of my invention is to provide a snap-in latch or fastener assembly which is not limited to a mounting opening of a particular configuration.

Other and further objects of my invention will appear from the following description.

In general my invention contemplates the provision of a snap-in latch or fastener assembly in which a fastener carrier resiliently supports a clamping element which snaps into position behind a mounting panel as the assembly moves into the panel opening securely to hold the assembly in position.

Brief description of the drawings

In the accompanying drawings which form part of the instant specification and which are to be read in conjunction therewith and in which like reference numerals are used to indicaate like parts in the various views:

FIGURE 1 is a side elevation of one form of my snap-in latch or fastener assembly.

FIGURE 2 is a bottom perspective of the assembly shown in FIGURE 1 with parts removed.

FIGURE 3 is a fragmentary perspective view of one form of locking arrangement which I may employ with my snap-in latch or fastener assembly.

FIGURE 4 is a fragmentary perspective view of an alternate form of locking means which I may employ with my snap-in latch or fastener assembly.

FIGURE 5 is a fragmentary perspective view of a further form of locking arrangement which I may employ with my snap-in latch or fastener assembly.

FIGURE 6 is a sectional view of an alternate form of my snap-in latch or fastener assembly.

FIGURE 7 is a top plan view of yet another form of my snap-in latch or fastener assembly.

FIGURE 8 is a sectional view of the form of my snap-in latch or fastener assembly shown in FIGURE 7 and taken along the line 8—8 of FIGURE 7.

FIGURE 9 is a sectional view of a still further form of my snap-in latch or fastener assembly.

Description of the preferred embodiment

Referring now to FIGURES 1 and 2 in the preferred form of my snap-in latch or fastener assembly indicated generally by the reference character 10, a frame indicated generally by the reference character 12 has sides 14 and 16, as well as ends 18 and 20. Sides 14 and 16 are provided with supporting flanges 22 and 24, which carry a pin or shaft 26 for rotably supporting the latching element, indicated generally by the reference character 28, of the assembly. Member 28 comprises a handle portion 30, a latch portion 32 and a locking pawl 34. A spring 36 carried by the pin 26 is biased between flange 24 and the underside of the handle portion 30, normally to urge the member 28 to the position shown in FIGURE 1.

A second pin 38 supported in the flanges 22 and 24 carries a trigger 40 normally biased by a spring 42 to a position at which it is flush with the frame 10.

The latch 28 and trigger 40 just described form part of my assembly but they do not, per se, form part of my invention. For that reason, they will not be described in detail. As is known in the art, in the latching position of latch 32 handle 30 is flush with the frame and is held in that position by virtue of the engagement of pawl 34 with trigger 40. When the latch is to be opened, trigger 40 is moved against the action of spring 42 out of engagement with pawl 34 to permit spring 36 to move the latching member 28 toward its open position illustrated in FIGURE 1.

The form of my snap-in latching assembly illustrated in FIGURES 1 and 2 include a leaf spring 44 having side flanges 46 and 48 which receive the pin 38 as well as a pin 50 which extends into the frame flanges 22 and 24. In this manner leaf spring 44 is securely mounted on the frame 12. An offset 52 on the spring arm 44 is formed with a clamping element 54 having a cam surface 56. I form the frame 12 with an end flange 58 having a guide slot 60 which receives the clamping element 54.

I provide the end of the frame 12 remote from the guide flange 58 with a spring clip 62. It will readily be appreciated that the frame 10 including side flanges 22 and 24, end flange 58 and clip 62 may be formed from a single piece of sheet metal.

The form of my snap-in latch assembly 10 illustrated in FIGURES 1 and 2 is adapted to be installed, for example, in an opening 64 in a first member 66, which is adapted to be latched to a second member 68. In applying the assembly 10 to the member 66 clip 62 first is slipped over the edge of the opening 64 and the entire assembly is pushed into the opening to bring the cam surface 56 into engagement with the edge of the opening. In response to continued pressure against the assembly, the clamping element 54 retracts and when the assembly has been pushed home snaps back into position behind the member 66. Thus the latch assembly is in a position at which it can be operated to cause the latch 32 to engage a strike (not shown) on the member 68.

While the spring clamp holds the assembly 10 in position on the member 66, I have discovered that, in most instances, it is desirable to provide the assembly with a positive lock for securely retaining it in the opening 64. That is, if no such positive lock is provided and the member 66 is sufficiently thick the clamping element 54 may present an inclined surface to the edge of the opening 64 to permit the element 54 to be cammed inwardly sufficiently to permit lifting of the frame out of the opening 64. Alternatively, if member 66 is too thin the spring may permit some lost motion of the latched part or door 68 engaged by latch 32.

Referring now to FIGURE 3, I have shown one form of positive lock with which I may provide the assembly 10. In this form of my device I provide the clamping element 54 with laterally extending locking tabs 70. I also form the edges of the guide slot 60 with a plurality of pairs of spaced notches 72 into which the tabs 70 may extend when the assembly is in position in the opening 64. It will readily be appreciated that, as the assembly is pushed home in the opening, the edge of the opening engages the cam surface 56 to move the element 54 inwardly a sufficient distance to disengage the tabs 70 from the notches 72. When the assembly has been pushed home so that the element 54 is clear of the underside of the member 66, it is permitted to snap back so that tabs 70 ride into the notches 72 of one pair of notches positively to lock the assembly in position. It will also be appreciated that the spaced pairs of notches 72 permit the assembly to be applied to members 66 of different thicknesses.

Referring now to FIGURE 4, I have shown an alternate form of locking arrangement wherein I form a pair of locking tabs 74 at the end of offset 52 outboard of the element 54 rather than on the element as in FIGURE 3. In this form of my device, rather than provide sets of notches 72 along the edges of the slot 60, I form pairs of notches 76 in the outer edges of the flange 58. The operation of this form of locking arrangement is substantially the same as is that of the form of the device shown in FIGURE 3.

Referring to FIGURE 5, in a still further form of locking arrangement I may provide laterally spaced clamping elements 78 and 80 on the end of offset 52. I form a single locking tab 81 on the offset 52 between the clamping elements 78 and 80. In this form of my device a guide 82 on the frame end 20 extends into the space between clamping elements 78 and 80. I provide guide 82 with spaced openings 84 adapted to cooperate with the tab 81 to lock the assembly in position in a manner analogous to that in which the tabs and notches of FIGURES 3 and 4 cooperate to achieve the locking operation.

Referring now to FIGURE 6, I have shown a snap-in fastener assembly including a push-button subassembly indicated generally by the reference character 86 and a cross pin subassembly indicated generally by the reference character 88. This fastener may, for example, be used to fasten a door or panel 90 to a frame 91. The subassembly 86 includes a spring housing 92 having an annular flange 94. A suitable spring washer 96 may be used to clamp the member 90 to the flange 94 to mount the assembly 86 in an opening 98 in the panel 90. A split ring retainer 100 or the like retains a cam assembly 102 in position within a cam housing 104. Since the cam assembly 102 does not, per se, form a part of my invention, it will not be described in detail. A coil spring 106 within housing 92 and around cam housing 104 bears between the base of the spring housing 92 and a flange 108 at the top of the cam housing 104 normally to urge housing 104 upwardly as viewed in FIGURE 6 with respect to the spring housing 92. A snap ring 110 or the like adjacent the bottom of the cam housing 104 limits the upward movement of the latter under the action of spring 106. I may provide the housing 104 with a cover 112 to complete the pushbutton subassembly 86.

The subassembly 88 comprises a cage 114 having an annular flange 116. The cage 114 houses a clamping member 118 having a base or retainer support 120 and a pair of spring arms 122 and 124 formed with clamping elements or retainers 126 and 128 which ride in slots 130 and 132 in the wall of the cage 114. I so form the clamping elements 126 and 128 as to provide cam surfaces 134 and 136. A spring 138 in the cage normally urges the clamping member 118 upwardly as viewed in FIGURE 6. I provide the base 120 with a centrally located, internally threaded annular boss 140 which receives the threaded portion of a cross pin shank 142 carrying a cross pin 144. Cage 114 has a lower central opening 146 through which the shank 142 extends and which may move freely therein.

In order to mount the subassembly 88 on the frame 91 it is inserted in a frame opening 148 and pushed therein until the edges of the opening engage surfaces 134 and 136 to cam the arms 122 and 124 inwardly until the clamping elements 126 and 128 move to a position behind frame 91. Arms 122 and 124 snap back behind the frame to hold the assembly in place.

In operation of this form of my fastener to secure the panel 90 to the frame 91, the pushbutton 112 is pressed inwardly and as the cross pin engages the cam track the button rotates until the cross pin enters the locking notch. A second actuation of the pushbutton results in disengaging of the cross pin from the locking notch and a resultant release of the fastener. Since this operation, per se, is known in the art I have not shown the details of the cam tracks.

In full lines in FIGURE 6 I have shown the assembly as being applied to two relatively thin members 90 and 91. As indicated in broken lines my fastener may be arranged to accommodate two considerably thicker elements 149 and 150. When that is done, spring washer 96 merely is positioned further down along the spring housing 92. The clamping element 118 is forced further downwardly until the elements 126 and 128 move behind the thicker member 150. In order for my device to function properly when applied to such thicker members, the shank 142 is threaded in the boss 140 until the cross pin 144 occupies the same position with relation to cams 102 as that which it occupied when the fastener was applied to the thinner members 90 and 91.

Referring now to FIGURES 7 and 8, I have shown a snap locking form my snap-in latch assembly which may be used, for example, to snap latch a cover 152 on a container 154, or the like. This snap locking snap-in latch assembly, indicated generally by the reference character 156, includes a supporting frame having a base 158, end walls 160 and 162, and flanges 164 and 166 at the tops of the end walls for engaging the outer surface of the cover 152 when the assembly is mounted in an opening 168 in a manner to be described. The frame receives a generally U-shaped clamping element 170 having lefthand and righthand spring arms 172 and 174 connected to the base 170 of the clamping member by bowed portions 176 and 178. I form respective clamping elements 180 and 182, cam surfaces 184 and 186 on the upper ends of the arms 172 and 174.

I provide the end 160 of the frame with spaced brackets 188 and 190 for receiving a pin 192 which pivotally supports a latch having sides 194 and 196 connected at one end by a web 198 and connected at the other end by a web 200. Spaced brackets 202 and 204 on base 170 carry a pin 206 which pivotally supports an operating lever 208. I provide this form of my latch with a coil spring 210, the upper end of which engages a tab 212 on web 200 normally to urge the snap latch to rotate in a counterclockwise direction as viewed in FIGURE 8. Web 200 engages the underside of the operating lever 208 to urge it to move in a counterclockwise direction therewith. This movement of the latch and of the lever 208 is limted by the engaging of the latch sides 194 and 196 with the underside of pin 206.

From the structure thus far described in connection with FIGURES 7 and 8, it will be seen that the bowed portions 176 and 178 are disposed in openings 211 and 213 in the frame. Moreover, the respective clamping elements 180 and 182 are disposed in openings 214 and 216 in the walls 160 and 162. When the latch is to be assembled in the opening 168 the assembly is pushed inwardly and cam surfaces 184 and 186 engage the edge of the opening and are cammed inwardly thereby. When the clamping members 180 and 182 have moved behind the cover 152, they snap in place to clamp the assembly in the opening 168.

With the assembly 156 in place, as the cover 152 moves toward the container 154, the edge of the container engages the web 198 to cam the latch in a clockwise direction, as viewed in FIGURE 8. When the cover 152 is firmly positioned in place the latch snaps back to the full line position shown and the cover is latched to the container. When it is desired to open the container, the righthand edge of the operating lever 208 is pushed to rotate the lever in a clockwise direction, thus to move the latch in a clockwise direction to withdraw the web 198 from its position behind the container 154. In the course of that operation the index finger, for example, may be inserted under lever 208 to facilitate movement of the cover away from the container. I have indicated the open position of the parts in broken lines in FIGURE 8.

Referring now to FIGURE 9, in a still further form of my snap-in latch or fastener assembly I have shown another type of flush mounted latch indicated generally by the reference character 218 in which a frame base 220 has arms 222 and 224 at the ends thereof. The arms carry flanges 226 and 228 which are to engage the outer surface of one member 230 of the members 230 and 232 to be latched when the assembly 218 is properly assembled in the opening 234 of member 230. The latch in this form of my device includes respective sides, one side 236 of which is shown in the drawing. Sides 236 are connected by a web 238 of material providing the operating surface for the latch and by a web 240 forming the latching part of the assembly. Frame 220 carries respective brackets 242, one of which is shown in the drawings and which brackets carry a pin 244 which pivotally supports the latch. A second pair of spaced brackets 246, one bracket of which is shown in FIGURE 9, carry a pin 248 which pivotally supports the pushbutton or trigger 250 of the assembly. Trigger 250 is adapted to engage a pawl 252 releasably to hold the latch in its closed position in a manner to be described.

The base 254 of the clamping element of the form of my invention shown in FIGURE 9 includes spring arms 256 and 258, at the tops of which I form clamping elements 260 and 262 having cam surfaces 264 and 266. The frame ends 222 and 224 are provided with openings 268 and 270 in which the clamping elements 260 and 262 are disposed.

A spring 272 carried by pin 244 bears between the underside of web 238 and a lug 274 struck out of base 254 normally to urge the latch to the open position illustrated in broken lines in the figure. A second spring 276 carried by pin 248 bears between base 254 and the underside of trigger 250 normally to urge the trigger in a counterclockwise direction, as viewed in FIGURE 9, to cause the trigger to engage pawl 252 releasably to hold the latch in its closed position.

In operation of the form of my assembly 10 shown in FIGURES 1 to 5, to mount the assembly in the opening 64 in the member 66, clip 62 is first pushed over the opening edge and then the entire assembly is swung into the opening. In the course of this movement, the edge of the opening engages surface 56 to push the spring arm 52 inwardly until element 54 is pushed behind member 66, at which time the spring arm will snap back into place to hold the assembly in the opening.

Preferably, I provide the assembly with locking lugs and notches or openings, as illustrated in any of FIGURES 3 to 5. In operation of the form of lugs and notches shown in FIGURE 3, for example, as element 54 moves behind member 66 so as to permit arm 52 to snap back, lugs 70 ride into notches 72 positively to lock the assembly on the member 66. Where a thicker member than the member 66 is involved it may be necessary to reach in through the frame and push spring 44 until element 54 is behind the member 66. Where a thicker member than member 66 is involved, tabs 70 will ride into a lower pair of notches. The operation of FIGURES 4 and 5 is analogous to that of FIGURE 3.

In operation of the form of my invention shown in FIGURE 6, the subassembly 86 is mounted on member 90 by placing the assembly in the opening and using a spring washer 96 to retain it in position. The subassembly 88 is mounted on member 91 from the "blind" side by pushing the clamping element 118 inwardly against the action of spring 138 to cause arms 122 and 124 to be cammed inwardly until the clamping elemnts 126 and 128 are located behind the member 91. The arms then snap back into place and the subassembly 88 is firmly held in position. It will be appreciated that the pushbutton spring 100 is considerably lighter than is the spring 138 so that when the fastener is operated, clamping member 118 will not be moved downwardly as viewed in FIGURE 6.

Where relatively thicker members than members 90 and 91, such as the indicator members 149 and 150, are involved, subassembly 86 is applied to the member 149 in the manner described above in connection with member 90, the spring washer 96 merely being located at a lower position. To apply the subassembly 88 to member 150, clamping member 118 is again pushed inwardly until elements 126 and 128 ride behind member 150, as indicated in broken lines in the figure. In order to ensure that the fastener will operate properly, shank 142 is threaded in the boss 140 until the cross pin 144 occupies the same relative position as that which it occupied when the fastener was applied to members 90 and 91.

In applying the form of my snap-in latch assembly 156 shown in FIGURES 7 and 8 to member 152, the assembly is pushed into the opening 168 until the elements 180 and 182 ride behind member 152 so as to snap into place. Assembly 218 is mounted in opening 260 in a similar manner. The operation of the latches shown in these figures will be apparent from the description given hereinabove.

It will be seen that I have accomplished the objects of my invention. I have provided a snap-in latch or fastener assembly which permits mounting of the assembly without the use of tools, or bolts, or rivets. My assembly permits a latch to be mounted in a rapid and expeditious manner. My assembly is readily replaceable. It is simple in its construction with the result achieved thereby.

It will be understood that certain features and subcombinations are of utility and may be employed without reference to other features and subcombinations. It is, therefore, to be understood that my invention is not to be limited to the specific details shown and described.

Having thus described my invention, what I claim is:

1. An assembly for expeditiously applying a fastener element to a member having an opening in which said element is to be mounted including in combination a support, means mounting said element on said support, a retainer carried by said support for movement to a position engaging a portion of said member adjacent said opening, means responsive to movement of said support into said opening for first moving said retainer to clear said opening and then to move said retainer to engaging position, means forming a notch on one of said support and said retainer and means forming a lug on the other of said support and said retainer, said lug adapted to enter into notch to lock said retainer in its engaging position when said support is in said opening.

2. An assembly as in claim 1 including means forming a plurality of spaced notches on said one of said retainer and said support, said lug adapted selectively to enter into one of said notches as said retainer moves to its operative position, the spacing between said notches corresponding to respective thicknesses of said member.

3. An assembly as in claim 1 in which said means responsive to movement of said support into said opening comprises a spring arm mounting said retainer on said support and means forming a cam surface on said retainer for engaging the edge of said opening as said support moves into said opening against the action of said spring arm, said assembly including a flange on said support for engaging the outer surface of said member when said retainer is in engaging position, a spring clip carried by said support at a location remote said retainer, said spring clip being adapted to engage a portion of said member adjacent said opening and means on said support forming a guide for said retainer.

4. An assembly for expeditiously applying a fastener element to a member having an opening in which said element is to be mounted including in combination, a cage having a flange adapted to engage the outer surface of said member when said cage is located in said opening, a retainer for engaging the inner surface of said member, a support for said retainer, resilient means mounting said retainer on said support for movement between a first position beyond the edge of said opening and a second position clear of the edge of said opening, means mounting said support on said cage for movement toward and away from said flange, spring means biasing said support toward said flange and a cam surface on said retainer for moving said retainer from said first position to said second position as said assembly is moved into said opening.

5. An assembly as in claim 4 including a fastener element and means adjustably mounting said fastener element on said support.

6. An assembly as in claim 4 in which said cage has a wall formed with a guide slot, said retainer extending through said slot in the first position thereof.

7. An assembly as in claim 4 including a second retainer, resilient means mounting said second retainer on said support for movement between a first position beyond the edge of said opening and a second position clear of the edge of said opening and a second cam surface on said second retainer for moving said second retainer from its first position to its second position as said assembly is moved into said opening.

8. An assembly as in claim 4 in which said cage has a wall with a pair of guide slots therein, said retainer mounting means comprising a resilient arm normally positioning said retainer in the first position thereof at which said retainer extends through one of said slots, a second retainer and a second resilient arm for mounting said second retainer on said support for movement between a first position at which the retainer extends through the other slot to a location beyond the edge of said opening and a second position clear of the edge of said opening, and a second cam surface on said second retainer for moving said second retainer from its first position to its second position as said assembly is moved into said opening.

9. An assembly for expeditiously applying a fastener element to a member having an opening in which said element is to be mounted including in combination, a cage having a wall provided with spaced guide slots, a flange on said cage for engaging the outer surface of said member when said cage is located in said opening, a retainer structure comprising a base, a pair of spring arms on said base and respective retainers carried by said spring arms for movement with respect to said base between first positions beyond the edge of said opening and second positions clear of the edge of said opening, said retainers extending through said slots in the first positions thereof, said retainers having cam surfaces for engaging the edge of said opening to move the retainers from their first positions to their second positions as said assembly is moved into said opening, and a spring biased between said cage and said base for urging said retainers toward said flange.

10. An assembly as in claim 9 including a fastener element adjustably carried by said base, said cage being provided with an opening through which said fastener element extends for access thereto to permit adjustment of the position thereof.

References Cited

UNITED STATES PATENTS

| 2,223,273 | 11/1940 | Slessman | 248—27 XR |
| 2,223,673 | 12/1940 | Catron et al. | 248—27 XR |
| 2,871,324 | 1/1959 | Budd | 248—27 XR |
| 3,019,501 | 2/1962 | Kraus et al. | 24—213 |
| 3,213,189 | 10/1965 | Mitchell et al. | 248—27 XR |
| 3,278,145 | 10/1966 | Leshuk | 248—27 |
| 3,332,648 | 7/1967 | Selinder | 248—27 |

ROY D. FRAZIER, *Primary Examiner.*

J. FRANKLIN FOSS, *Assistant Examiner.*

U.S. Cl. X.R.

24—213; 248—27, 361